United States Patent
Schmidt-Milkau et al.

[11] Patent Number: 5,223,680
[45] Date of Patent: Jun. 29, 1993

[54] MEASURING ELEVATOR CAR POSITION USING ULTRASOUND

[75] Inventors: Claudia M. Schmidt-Milkau; Klaus Disterer; Rolf E. Hanitsch, all of Berlin, Fed. Rep. of Germany

[73] Assignee: Otis Elevator Company, Farmington, Conn.

[21] Appl. No.: 709,796

[22] Filed: Jun. 3, 1991

Related U.S. Application Data

[63] Continuation-in-part of Ser. No. 07/695,364, May 3, 1991, abandoned.

[51] Int. Cl.⁵ .......................... B66B 3/02; G01S 3/80
[52] U.S. Cl. .................................. 187/134; 187/136; 367/117; 367/127
[58] Field of Search ............... 187/132, 134, 104, 105, 187/107, 136; 367/93, 8, 117, 127; 340/1; 385/5

[56] References Cited

U.S. PATENT DOCUMENTS

| | | | |
|---|---|---|---|
| Re. 30,719 | 8/1981 | Mills | 187/52 R |
| 3,098,992 | 7/1963 | Rath | 340/1 |
| 4,023,135 | 5/1977 | Hanmura et al. | 367/93 |
| 4,254,478 | 3/1981 | Dumas | 367/2 |
| 4,537,287 | 8/1985 | Noda et al. | 187/132 |
| 4,894,810 | 1/1990 | Jukkala | 367/118 |
| 4,910,464 | 3/1990 | Trett et al. | 385/5 |

Primary Examiner—Steven L. Stephan
Assistant Examiner—Robert F. Nappi
Attorney, Agent, or Firm—Breffni X. Baggot

[57] ABSTRACT

Two ultrasonic transducers are provided, one upon the ceiling of an elevator hoistway and the other one the top of an elevator car for measuring the time for an ultrasonic signal to travel from one transducer to another and return for treasuring elevator position.

7 Claims, 4 Drawing Sheets

MEASURING ELEVATOR CAR POSITION USING ULTRASOUND

This is a continuation-in-part of application Ser. No. 07/695,364 filed on May 3, 1991, now abandoned.

TECHNICAL FIELD

This invention relates to measuring elevator position, and particularly using ultrasound.

BACKGROUND OF THE INVENTION

In general, encoders at the drive shaft, on the one hand, and additional vanes and sensors in the hoistway, on the other hand, are used to detect elevator car position. In an emergency affecting the power source, the position information can be written into an EEPROM or battery backed-up RAM to avoid the loss of that information. However, if the car moves independently of the elevator drive after the power supply has failed, or after getting the last position signal, actual car position is lost. In such a case, after connecting to the line voltage, the car position is usually obtained by means of an initialization run. U.S. Pat. No. 4,341,287 shows such a system. In other applications, multi-channel encoders are coupled to the car by a steel tape, holed or having magnets placed thereon, and the pulse train signals from the encoder are transformed to position information. The position initialization is accomplished by moving the car a few centimeters. Other prior art arrangements use coded indicia in the hoistway and appropriate readers of the indicia on the car or batteries for powering car position memory circuits during a power outage.

Absolute car position is the distance of the car from the top or bottom obtained without the need for a run to a terminal landing. Usually, when a car loses power, it loses position and has to run to terminal, whether at the top or bottom of the hoistway, to find where it is.

It would be desirable to determine absolute car position, without requiring the car to move to a predetermined hoistway and code readers on the car, and without requiring batteries or other auxiliary power supplies for storing the position the car had before power failure.

There is a wide range of requirements for elevator position indicators, but not every requirement must be fulfilled. For instance, in cases of an emergency, it is enough to know the approximate location of the car. In order to get the car position directly, the position sensor should be located in the hoistway. This requires a sensor system, which is insensitive to dust and acoustical interferences. For this reason, optical methods, such as infrared and laser, are unacceptable. Optical sensors are sensitive to dust because the light intensity decreases where a layer of dust appears on the lens or reflector. In addition, there is a need of regular maintenance which increases costs.

SUMMARY OF THE INVENTION

According to the present invention, two ultrasonic transducers are provided, one upon the ceiling of an elevator hoistway and the other upon the top of an elevator car for measuring distance. In addition, two delay elements are provided. A start signal initiates the distance measurement and causes a first ultrasonic signal to be transmitted from the ceiling transducer to the car transducer. After receipt of the first ultrasonic signal by the car transducer, and a far-echo delay for avoiding ultrasonic echoes from the hoistway walls and hoist ropes, a second ultrasonic signal of the same amplitude and frequency is transmitted from the car transducer to the ceiling transducer. The ceiling transducer receives the second ultrasonic signal and provides a stop signal. A near-echo delay element prevents the stop signal from reaching a timer until the end of a selectable time. A timer, responsive to a start signal and a stop signal, measures the travel time of the ultrasonic signals. The multiplication of the travel time of the signals with their speed, and use of the two echo-avoiding delays, yields distance while at the same time avoiding echoes. Moreover, because the hoistway temperature is measured and used in the position calculation, error due to temperature effects is avoided.

It is an object of the present invention to determine the distance of a car from a hoistway end by use of ultrasound.

It is a second object of the present invention to determine the distance of a car from a hoistway end after a loss of power.

It is a third object of the present invention to determine the distance of a car from a hoistway end after a power loss by means of remote sensors.

It is a fourth object of the present invention to determine the distance of a car from a hoistway end after a power loss using ultrasound.

It is a fifth object of the present invention to determine the distance of a car from a hoistway end by means of ultrasound in case of an emergency.

It is a sixth object of the present invention to obtain the distance of a car from a hoistway end before the first run after a power loss without the need for an initialization run.

It is a seventh object of the present invention to provide an distance of a car from a hoistway end measuring system and method which is insensitive to acoustic interference.

It is a ninth object of the present invention to provide a distance of a car from a hoistway end measuring system that is responsive to temperature.

These and other objects, features and advantages of the present invention will become more apparent in light of the following detailed description of a best mode embodiment thereof, as illustrated in the accompanying drawings.

BEST MODE EMBODIMENT OF THE INVENTION

Figure 1:
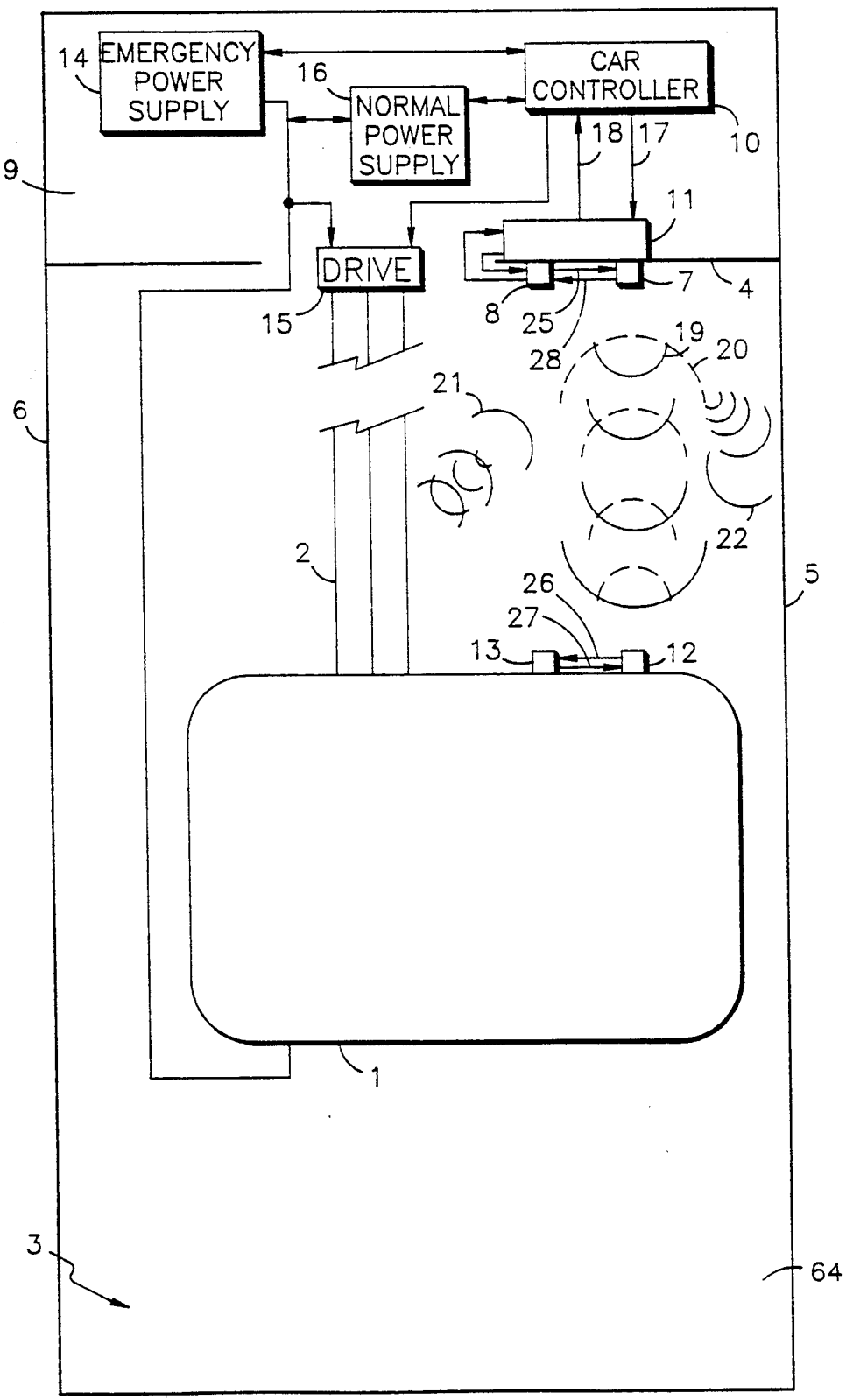
FIG. 1 is a front elevational schematic view of an elevator car in its shaft, showing a pair of ultrasonic transducers, one on the ceiling and one on top of the car.

In FIG. 1, an elevator car 1 is suspended from ropes 2 in a hoistway 3 having a ceiling 4 and walls 5, 6. Mounted on the ceiling 4 is a ceiling transducer 7 and ceiling transducer circuit 8. In the machine room 9 is an elevator controller 10. Electrically connected to the ceiling transducer circuit 8 is a time and distance detection circuit 11. Mounted upon the roof of the car 1 is a car transducer 12 directed toward the ceiling transducer 7. Both transducers 7, 12 are located between the hoistway walls 5, 6 and the ropes 2. Electrically connected to the car transducer 12 is car transducer circuit 13.

Many voltage-to-pressure transducers are available for the transmission and reception of ultrasound. In the preferred embodiment, the ultrasonic transducers 7, 12 are piezo-ceramic, capable of sending and receiving signals of about 50 kHz.

In the preferred embodiment, power for the car transducer 12 is taken from an emergency power supply 14 which provides power to the car 1 and drive 15. Such an emergency power supply 14 is operable when the normal power supply 16 fails, as known in the art. Also, upon a failure of the normal power supply 16, the car is braked to a stop. The car transducer 12 could be powered from the normal power supply 16. Aside from power, a start signal on a line 17, and a measurement signal on a line 18, the present invention works independently of the controller 10.

The ceiling transducer 7 sends probe signals to the car transducer 12 and the car transducer 7 responds with a response signal. In the time and distance detection circuit 11, the distance between the transducers 7, 12 is calculated by multiplying the travel time of ultrasonic probe and response signals 19, 20 by their speed.

However, not all of the signal emitted by an ultrasonic transducer, or any transducer, is transmitted directly to its target; some of it is scattered elsewhere. The same transducers 7, 12 which provide the probe and response signals also provide echoes reflected off the hoistway walls 5, 6. These echoes may be expensively avoided by the use of an acoustic lens attached to the face of each transducer 7, 12.

There are two types of echoes which may affect the present invention: near echoes and far echoes. All echoes caused by transmitted ultrasonic waves reflected off the walls 5, 6, have the same frequency and intensity as a direct, unreflected incoming signal. Accordingly, differentiating between direct signals and echoes 21, 22 is difficult.

Near echoes 21 (FIG. 1) can produce a signal which would indicate the end of the measurement. They do this by hitting some object and rebounding onto the ceiling transducer 7 before the car transducer 12 responds with an ultrasonic response signal 20. The length of the path followed by the near-echo may vary, especially with the cross-sectional area of the hoistway 3.

Far echoes 22 (FIG. 1) are ultrasonic signals emitted from the ceiling transducer 7, which, rather than proceeding directly to the car transducer 12, hit the walls 5, 6 and then the car transducer 12. Because this ultrasonic signal 22 does not travel the shortest distance between the two transducers 7, 12, measuring it can only distort the distance calculation. The length of the path followed by this echo may vary, especially with the cross-sectional area of the hoistway 3 and the vertical distance between the ceiling transducer 7 and car 1.

Figure 2:
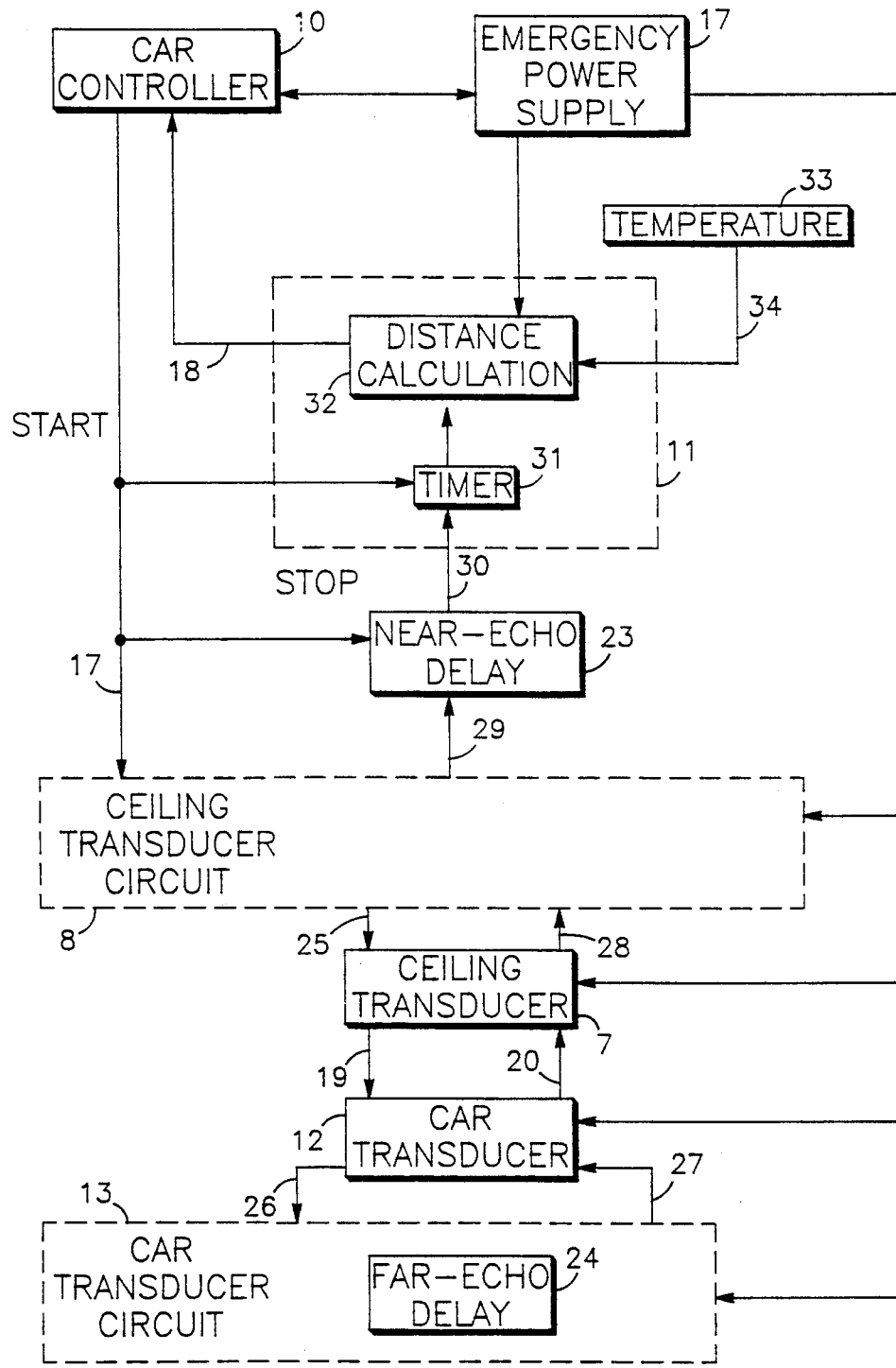
FIG. 2 is a block diagram of a pair of ultrasonic transducers, accompanying circuits, two delay elements, and a time and distance detection circuit.

FIG. 2 shows the preferred measuring method of the present invention. Fundamentally, it contains two transducers 7, 12, a time and distance detection circuit 11, for measuring the time for a signal to pass twice between the transducers 7, 12 and two delay elements 23, 24. The delays are similar in two ways and dissimilar in two ways. Both delays account for echoes 21, 22 (FIG. 1), and both account for echoes 21, 22 caused by the same transducer (the ceiling transducer 7), but each accounts for a different type of echo affecting a different transducer. To avoid false stopping of the measurement, a near-echo delay element 23 is inserted. In the preferred embodiment, this is a delay of 220 milliseconds provided in response of the start signal. During the 220 ms, no stop signal can be received by the time and distance detection circuit. To avoid the effects of far echoes, a far-echo delay 24 is used. In the preferred embodiment the value of the far-echo delay is 262.144 ms. Because the paths of both echoes 21, 22 are variable, the elements 23, 24 have variable delays.

After a start signal on a line 17 from the controller 10, the ceiling transducer circuit 8 modulates the start signal and provides a first pulse train on a line 25 to the ceiling transducer 7. The ceiling transducer 7 transmits a 50 kHz ultrasonic probe signal 19 to the car transducer circuit 13. The car transducer 12 receives the 50 kHz signal and provides it to the car transducer circuit 13 on a line 26. After a delay of 262.144 ms introduced by a far-echo delay element 24, during which time far-echoes 22 have faded away, the car transducer circuit 13 responds with another 50 kHz signal on a line 27 to the car transducer 12. A response ultrasonic signal 20 is provided to the ceiling transducer 7. The ceiling transducer 7 provides the response signal 20 to the ceiling transducer circuit 8 on a line 28. The ceiling transducer circuit 8 filters, amplifies, and demodulates, thereby detecting the envelope of the response signal 20. An echo-containing stop signal is provided to the near-echo delay 23 on a line 29. 220 ms after the start signal, the stop signal, free of near echoes 22, is provided line 30 to the time and distance detection circuit 11.

The time and distance detection circuit 11, responsive to the start signal on line 17, measures the time between (i) 220 ms after the receipt of the start signal and (ii) receipt of the stop signal. The time and distance detection circuit 11 includes a timer 31 and a distance detection circuit 32. The timer 31 accounts for the 262.144 ms, according to the far-echo delay 24 delay and a delay to account for signal processing time in the ceiling transducer 7, car transducer 12. The distance calculation is a function of temperature as well as the travel time of the ultrasonic signals. A thermistor 33 provides a temperature measurement on a line 34 to the distance calculation circuit 32. The position of the elevator is fed to the controller 10 on line 18.

Figure 3:
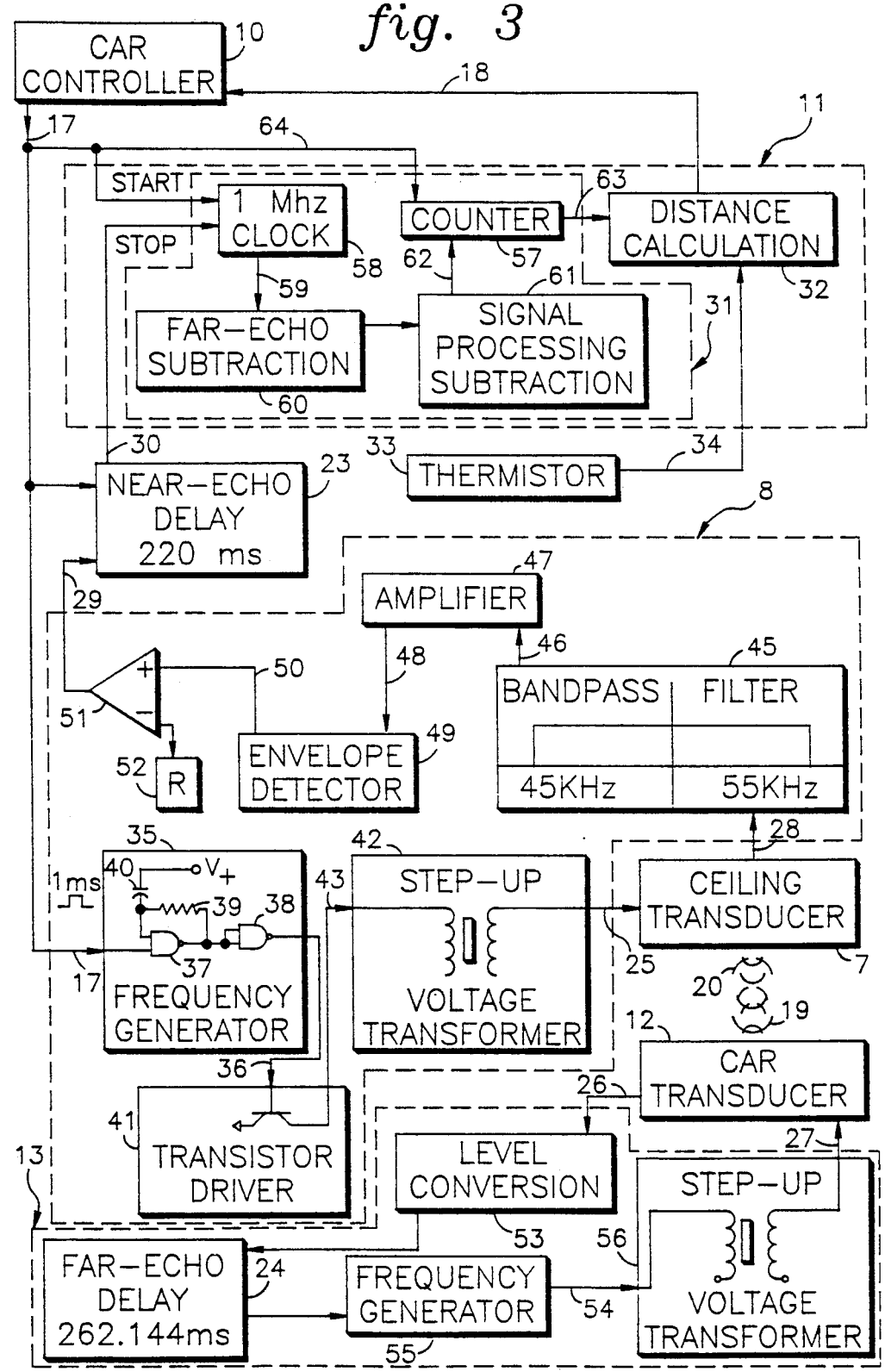
FIG. 3 is a more detailed block diagram of FIG. 2.

FIG. 3 is a block diagram of the controller 10, ceiling transducer 7, car transducer 12, ceiling transducer circuit 8, car transducer circuit 13, near-echo delay element 23, and time and distance detection circuit 11. In the ceiling transducer circuit 8, a positive polarity start signal on a line 17 is provided to a frequency generator 35 yielding, on a line 36, a first pulse train with a width of one (1) ms, the width of the start signal on line 17. The frequency generator 35 provides square waves in the preferred embodiment; however, it may provide triangle, sine, or waves of any other periodic form. In the preferred embodiment, the frequency generator 35 is set at 50 kHz. The frequency generator 35 includes two NAND gates 37, 38 coupled back over an RC-oscillator circuit comprising a resistor 39 and capacitor 40. The first pulse train on line 36 is amplified by a transistor driver 41 with the primary winding of a transformer 42 connected to the collector by a line 43. The transformer 42 further amplifies the first pulse train and provides the amplified first pulse train on line 25 to the ceiling transducer 7 as an ultrasonic signal 19. In the preferred embodiment, the ceiling transducer 7 needs a high voltage level. Therefore, the transformer 42 is a step-up voltage transformer. The amplified first pulse train is transmitted by the ceiling transducer 7 to the car transducer 12. In response, a second amplified pulse train is provided by the car transducer circuit 13 on line 27 to the car transducer 12, and a response ultrasonic signal 20 is provided to the ceiling transducer 7. The response ultrasonic signal 20 is provided on line 28 to a band-pass filter 45 matched to the frequency of the frequency generator 35. In the preferred embodiment, the match is accomplished by a band-pass filter centered at 50 KHz and having a bandwidth of 10 khz.

The filtered signal is provided on a line 46 to an amplifier 47. After receiving the amplified, filtered, response signal on a line 48, an envelope detector 49 demodulates it, dividing out the 50 kHz pulses and delivering an envelope signal on a line 50 corresponding to the envelope of the pulse train.

In the preferred embodiment, the envelope detector 49 is a wired VALVO-IC TDA 1576, of Phillips Inc., Hamburg, Germany. It forms the amplified, filtered response signal (50 kHz) into a DC-signal. The DC-level is proportional to the amplitude of the signals 19, 20 received by the ultrasonic transducers 12, 7 so long as the emplifier 47 is not in saturation.

The envelope signal on line 50 is provided to a comparator 51 for comparison with an adjustable threshold set by a variable resistor 52. The comparator 51 provides an echo-containing stop signal on a line 29 which indicates the end of the measurement. The echo-containing stop signal contains near-echoes 22 which are cut out due tot the near-echo delay. The threshold is kept as low as possible in order to detect small incoming response signals obtained when the transducers are far apart. At the same time, the threshold must be high enough to suppress sound disturbances.

The combined function of the filter 45, amplifier 47, and envelope detector 49 is level conversion.

On the car 1, the transmitted ultrasonic signal 19 is received by the car transducer 12 and provided to a level conversion section 53 on a line 26. The level conversion section 53 consists of a 50 kHz band-pass filter (not shown), an amplifier (not shown), and envelope detector (not shown), identical to the band-pass filter 45, amplifier 47, and envelope detector 49. A second pulse train on a line 54 is formed in a frequency generator 55 after a delay of 262.144 ms in far-echo delay element 24. The second pulse train is provided to a step-up voltage transformer 56 and from there, on line 27, to the car transducer 12 for providing a response ultrasonic signal 20.

The time and distance detection circuit 11 is responsive to the start signal on the line 17 and the stop signal on a line 30. The time measurement is started when the start signal resets a counter 57 and triggers a clock 58 and the frequency generator 35 of the ceiling transducer 7. The response ultrasonic signal 20 stops the measurement by stopping the timer 31.

To avoid false stopping of the measurement, a near-echo delay element 23 is inserted to suppress near-echoes 22. The delay is provided for 220 ms after receipt of the start signal. The stop signal on line 30 is not the same as the echo-containing stop signal on line 29 from the comparator. The output from the comparator 51 includes all false negative pulses due to the above-mentioned signals. After the start signal and during the 220 ms, no stop signal on line 30 can be by the one (1) MHz clock 58. Accordingly, the stop signal on line 30 is free of near echoes 21.

The stop signal on line 30 stops the clock 58. The clock signal produced by the clock since the start signal is provided on a line 59 to a far-echo subtraction element 60 for subtracting 262.144 ms. After a second subtraction of the time required for propagation delays and signal processing lags in a lag subtraction element 61, the clock signal is provided on line 62 to the counter 57. The counter 57 counts the clock pulses, registers the sound travel time, and on a line 63, provides a travel time signal, having a magnitude representative of the sound travel time, to the distance calculation section 32. The counter 57 is reset with each start signal on line 64. The distance between the transducers 7, 12 is calculated by multiplying by one-half the sound travel time multiplied by the signal speed, which depends on the temperature of the hoistway 3 measured with a thermistor 33. The sound travel time depends on the sound transmission speed, C:

$$C = C_o * \sqrt{1 + \frac{\text{Temperature}}{273° \text{C.}}} \text{ m/s} \qquad \text{Equation 1}$$

$$\text{Distance} = (\text{sound travel time}/2) \times C \qquad \text{Equation 2}$$

with $C_0$ equal to 331.45 meters per at 0°. Celsius. The measurement on line 18 is provided to the controller 10. A high degree of accuracy is achieved for a car moving less than one (1) meter/second. For a stationary elevator, the preferred embodiment, the invention can determine car position with an error of 10 centimeters.

The positions of the transducers may be reversed.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

For example, it is irrelevant to the invention whether the pair of transducers 7, 12 is above or below the car. The above-mentioned positioning of the transducers 7, 12 shown in FIG. 1 is preferable to a positioning of a transducer on the bottom of the car 1 and a second transducer in the hoistway pit 64, because generally the controller 10 is above the top floor. Therefore, the communication line between the hoistway ceiling 4 and the controller 10 is shorter than that between the pit 14 and controller 10.

Figure 4:
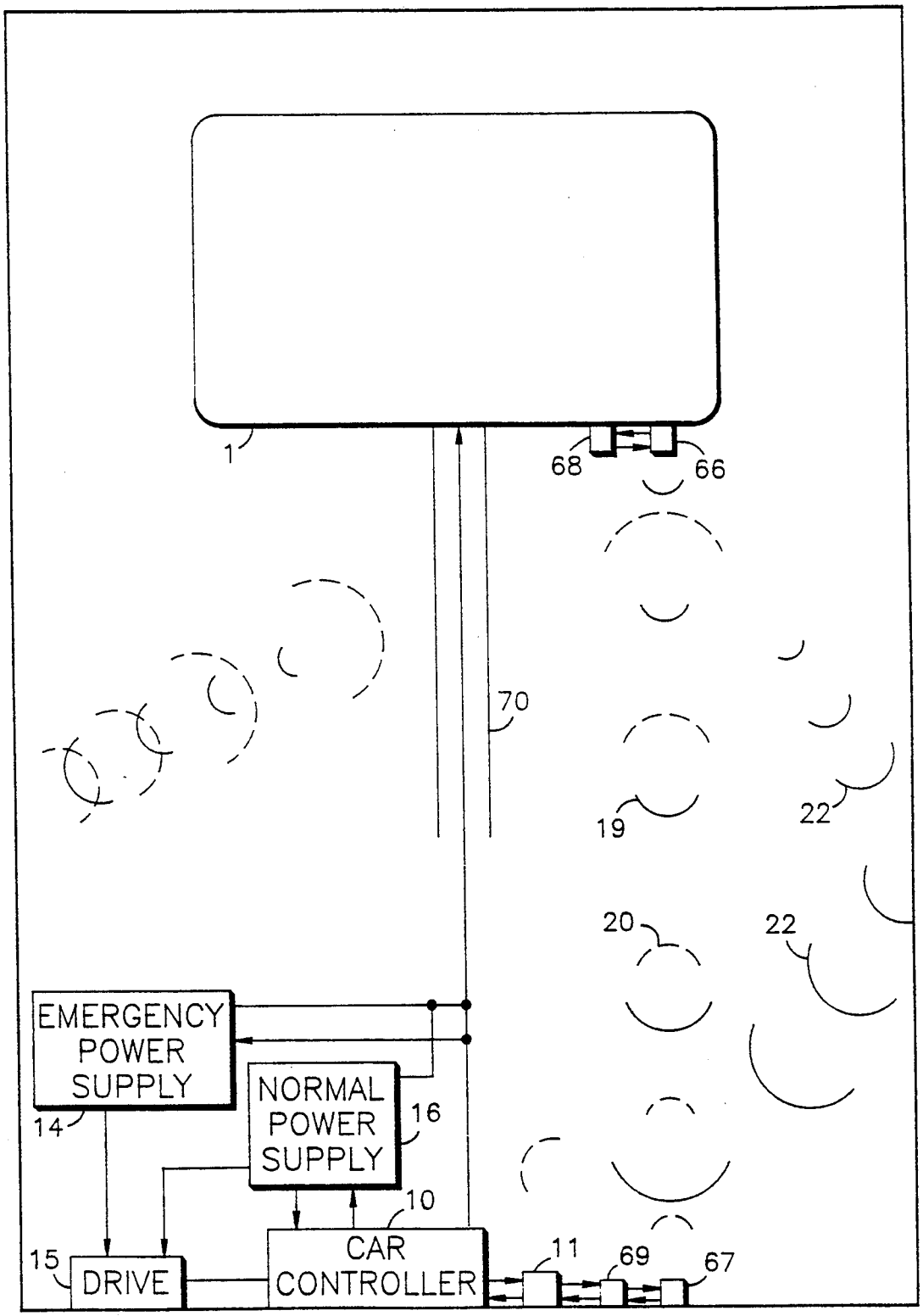
FIG. 4 is a front elevational schematic view of a hydraulic elevator and a car in its shaft, showing a pair of ultrasonic transducers, one on the bottom of the car and one in the pit.

For example, in a hydraulic elevator system (FIG. 4), wherein the controller 10 is in the pit 14, it is desirable to place a car bottom transducer 66 on the bottom of the car 1 and a pit transducer 67 in the pit 14 of the hoistway 3. Associated with the car bottom transducer 66 is a car bottom transducer circuit 68, and associated with the pit transducer 67 is a pit transducer circuit 69. The hydraulic elevator is hoisted by plunger 70.

It is similarly unimportant to the claimed invention whether the object being hoisted in the elevator shaft is the car 1 or a counterweight. The preferred embodiment gives absolute position of the car. Where the transducers 7, 12 are mounted on the ceiling 4 and a counterweight to the car, the preferred embodiment is modified so that the distance calculation circuit adds a constant corresponding to the difference between counterweight position and position of the car 1. In the distance calculation circuit 32, a table contains the appropriate constant for a given counterweight position to be added to obtain the corresponding car position. The table has two columns and an unlimited number of rows. One column contains counterweight positions, and the other column contains the constants to be added to obtain car position. For example, when the counterweight is halfway down the hoistway, the constant is zero.

Finally, it is not essential to the invention whether the start signal first triggers the ceiling transducer 7 or the car transducer 12.

It should be understood by those skilled in the art that the foregoing and various other changes, omissions, and additions in the form and detail thereof may be made therein without departing from the spirit and scope of the invention.

We claim:

1. A method for measuring the distance between an end of a hoistway and a stationary elevator car, comprising the steps of:
    providing first and second ultrasonic transducers;
    transmitting a first ultrasonic signal from said first ultrasonic transducer to said second ultrasonic transducer;
    receiving said first ultrasonic signal at said second ultrasonic transducer and, in response thereto, provide a second ultrasonic signal to said fist ultrasonic transducer;
    receiving said second ultrasonic signal at said first ultrasonic transducer;
    measuring the time elapsed between said step of transmitting and said step of receiving said second ultrasonic signal and providing a travel time signal;
    measuring the temperature of the air in said hoistway and providing a temperature signal and
    calculating the distance between said hoistway end and said elevator car in response to said travel time signal and said temperature signal.

2. The method of claim 1, further including the steps of:
    providing a first delay following the receipt of said first ultrasonic signal by said second transducer, in response to said first ultrasonic signal prior to providing said second ultrasonic signal;
    measuring the temperature of the air in said hoistway and providing a temperature signal;
    calculating the position of said elevator car in response to said travel time signal and said temperature signal; and
    wherein said second ultrasonic signal may not be received until after a second time delay, 3. The method of claim 1, wherein said step of transmitting said first ultrasonic signal occurs in response to a failure of a normal power supply, wherein said second ultrasonic signal may be be received until after a second time delay, and wherein said method further includes the steps of:
    providing a first delay following the receipt of said first ultrasonic signal by said second transducer, in response to said first ultrasonic signal prior to providing said second ultrasonic signal;
    measuring the temperatures of the air in said hoistway and providing a temperature signal; and
    calculating the distance between said hoistway end and said elevator car in response to said travel item signal and said temperature signal.

4. An apparatus for measuring the distance between an end of a hoistway and as stationary elevator car, comprising:
    first and second ultrasonic transducer, said transducers facing each other, is first ultrasonic transducer for transmitting a first ultrasonic signal from said first ultrasonic transducer to said second ultrasonic transducer, said second ultrasonic transducer for receiving said first ultrasonic signal at said second ultrasonic transducer and, in response thereto and following a firs delay, providing a second ultrasonic signal to said fist ultrasonic transducer;
    a timer, operable after a second delay, for measuring the time elapsed between the transmission of said first ultrasonic signal and the receipt of said second ultrasonic signal at said first ultrasonic transducer, and providing a travel time signal and said temperature signal;
    temperature sensing means for measuring the temperature of the air in said hoistway and providing at temperature signal; and
    calculating means, for calculating the distance between said hoistway end and said elevator car in response to said travel time signal.

5. The operation of claim 4, wherein said first ultrasonic transducer is powered in response to a failure of a normal power supply.

6. The apparatus of claim 4, wherein one of said ultrasonic transducers is mounted beneath the elevator car.

7. The apparatus of claim 4, wherein one of said ultrasonic transducers is mounted on top of the elevator car.

* * * * *